(12) United States Patent
Chen et al.

(10) Patent No.: US 7,845,608 B1
(45) Date of Patent: Dec. 7, 2010

(54) MOUNTING APPARATUS FOR ELECTRONIC DEVICE

(75) Inventors: Yun-Lung Chen, Taipei Hsien (TW); Nian-Yuan Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng,Taipei Hsien (TW)

( * ) Notice: Subject to any disclaimer, the term of this patent is extended or adjusted under 35 U.S.C. 154(b) by 0 days.

(21) Appl. No.: 12/603,658

(22) Filed: Oct. 22, 2009

(51) Int. Cl.
*A47F 5/00* (2006.01)

(52) U.S. Cl. ............... 248/309.1; 248/297.21; 248/921; 361/679.22

(58) Field of Classification Search ............. 248/309.1, 248/310, 297.21, 298.1, 917, 919; 361/679.22
See application file for complete search history.

(56) References Cited

U.S. PATENT DOCUMENTS

| | | | |
|---|---|---|---|
| 2,566,656 A * | 9/1951 | David | 15/267 |
| 4,022,416 A * | 5/1977 | Kaye et al. | 248/318 |
| 2004/0056161 A1* | 3/2004 | Ishizaki et al. | 248/176.3 |
| 2006/0175476 A1* | 8/2006 | Hasegawa et al. | 248/125.1 |
| 2008/0117574 A1* | 5/2008 | Lee | 361/681 |
| 2010/0181454 A1* | 7/2010 | Vogt | 248/309.1 |

\* cited by examiner

*Primary Examiner*—Ramon O Ramirez
(74) *Attorney, Agent, or Firm*—D. Austin Bonderer

(57) ABSTRACT

A mounting apparatus includes a support member, a sliding member, a spring member, and a cover. The support member is configured for maintaining an electronic device thereon. The sliding member is configured for being secured on a display. A retaining portion is located on the sliding member and defines a through hole. A spring member is secured on the support member and engages the through hole of the sliding member. A cover is secured on the support member to position the sliding member between the support member and the cover. The sliding member is slidable relative to the support member and the spring member, and the retaining portion resiliently deforms the spring member.

15 Claims, 6 Drawing Sheets

MOUNTING APPARATUS FOR ELECTRONIC DEVICE

BACKGROUND

1. Technical Field

The present disclosure relates to mounting apparatuses, and particularly to a mounting apparatus for securing an electronic device.

2. Description of Related Art

A thin client host is conventionally placed on a desk. However, in many circumstances, a user may need the space on the desk for some other purpose or just prefer to keep the desk as clear as possible and so the thin client host is place somewhere else.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
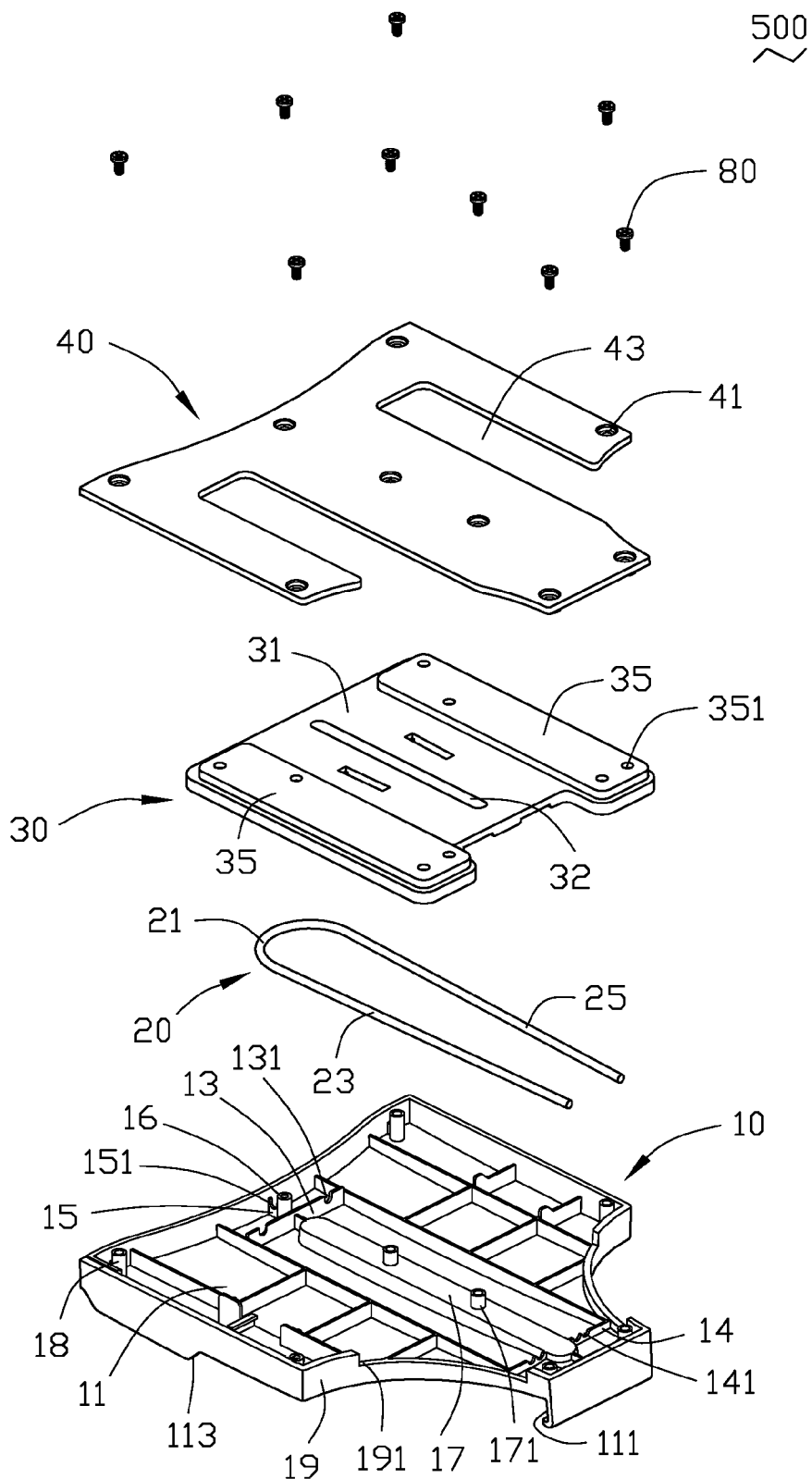
FIG. 1 is an exploded, isometric view of an embodiment of a mounting apparatus.

Referring to FIG. 1, a mounting apparatus in accordance with an embodiment includes a bracket 500. The bracket 500 is configured to be secured on a display 300, and configured to secure an electronic device 100 thereon. The electronic device 100 (shown in FIG. 4) may be, for example, a thin client host, or other electronic devices.

The bracket 500 includes a support member 10, a spring member 20, a sliding member 30, and a cover 40.

The support member 10 includes a bottom wall 11. A first flange 13 and a second flange 14 parallel to the first flange 13 are perpendicularly located in a middle portion of the bottom wall 11. Two first cutouts 131 are defined in the first flange 13 respectively adjacent two opposite ends. Four second cutouts 141 are defined in the second flange 14. A distance between the first cutouts 131 is greater than a distance between each two second cutouts 141. A third flange 15 is perpendicularly located in bottom wall 11, and extends from a middle of the first flange 13. The third flange 15 is perpendicular to the first flange 13 and the second flange 14. A third cutout 151 is defined in the third flange 15. A first mounting post 16 with a first mounting hole defined therein is located on the bottom wall 11 between the third cutout 151 and the first flange 13. A protrusion 17 protrudes from the bottom wall 11 at a middle portion thereof. Two positioning posts 171, each with a positioning hole defined therein, are perpendicularly located on the protrusion 17. A plurality of second mounting posts 18, each with a second mounting hole defined therein, is perpendicularly located on the bottom wall 11. Two sidewalls 19 are perpendicularly bent from two arc-shaped edges of the bottom wall 11. An access 191 is defined in each sidewall 19. A support flange 111 and two positioning flange 113 are located on the bottom wall 11 at a side opposite to the side where the first flange 13 and the second flange 14 are positioned.

The spring member 20 includes an arc-shaped base portion 21, and two extending portions 23, 25 respectively extending from to two ends of the arc-shaped base portion 21.

Figure 2:
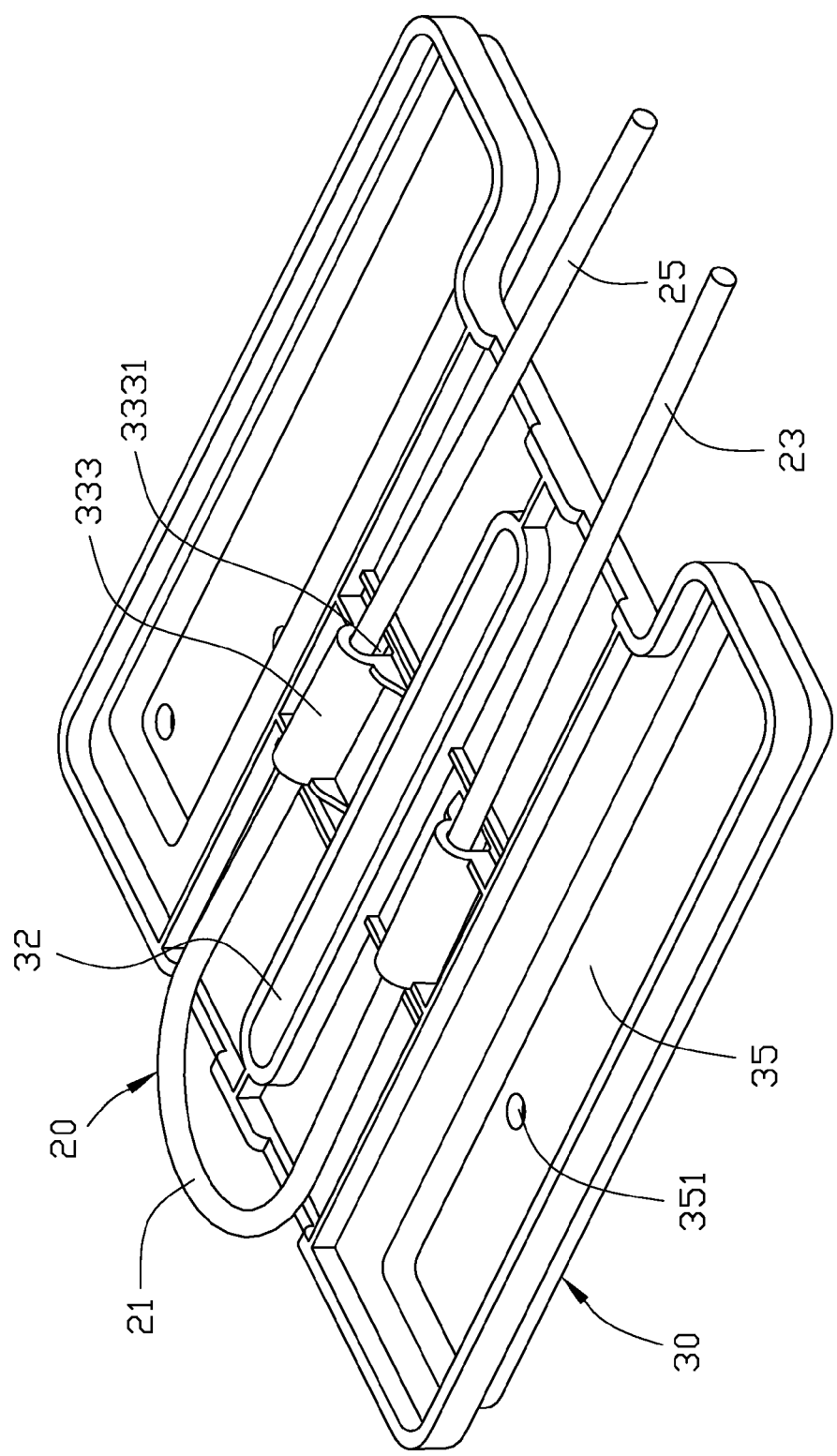
FIG. 2 is a partially assembled view of the embodiment shown in FIG. 1.

The sliding member 30 includes a base body 31, and a sliding slot 32 is defined in a middle portion of the sliding member 30. Two sliding portions 35 protrude from the base portion 31 at opposite sides of the sliding slot 32. Four first securing holes 351 are defined in the sliding portions 35. Referring also to FIG. 2, two retaining portions 333 are formed in an opposite side of the sliding member 30 in a middle portion. A through hole 3331 is defined in each retaining portion 333 for receiving the spring member 20.

The cover 40 is configured to be secured on the support member 10, and defines a plurality of cover holes 41, corresponding to the first mounting post 16, the second mounting posts 18, and the positioning posts 17. Two sliding openings 43 are defined in the cover 40, and configured for receiving the sliding portions 35 of the sliding member 30.

Figure 3:
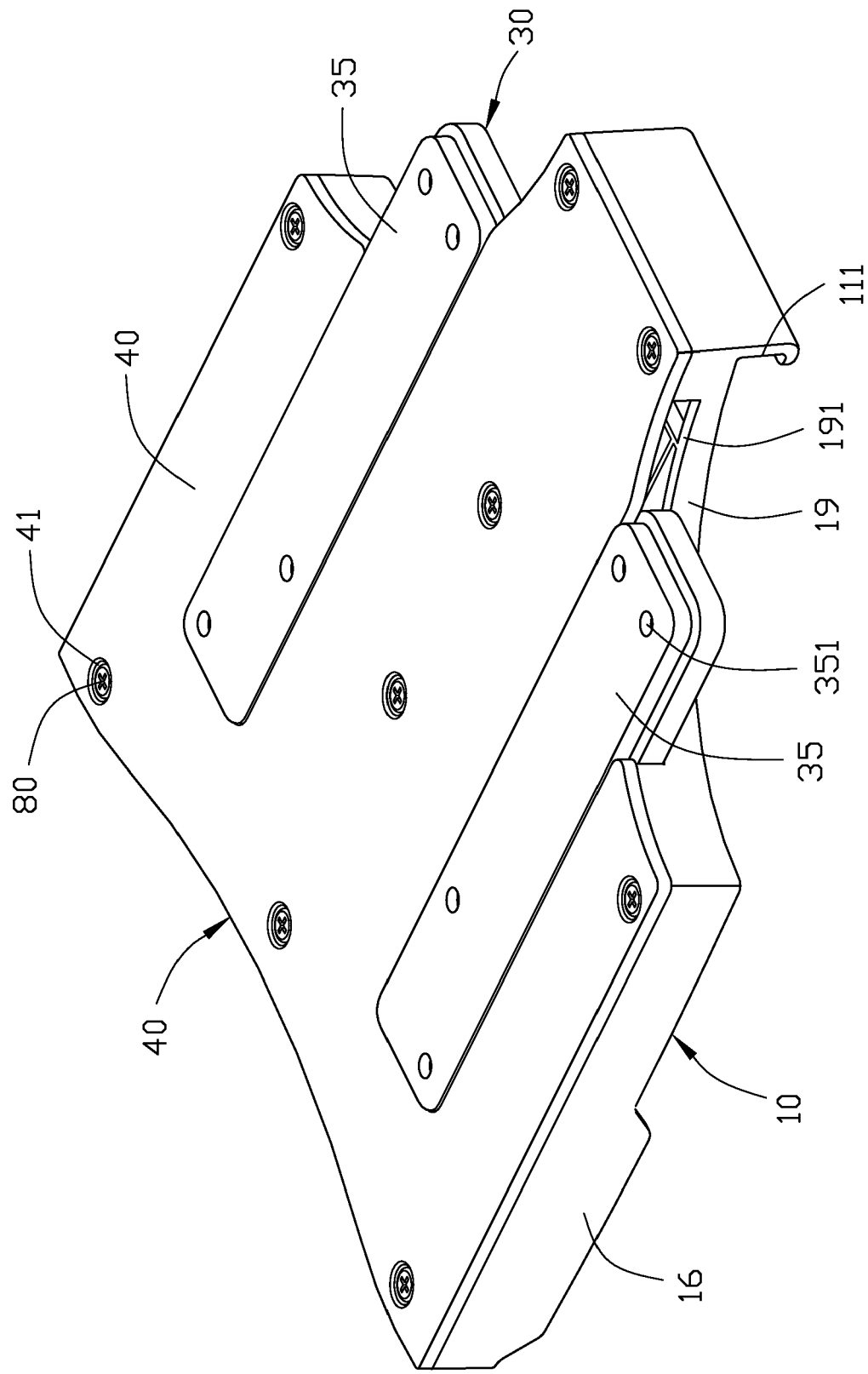
FIG. 3 is an assembled of the embodiment shown in FIG. 1.
Figure 4:
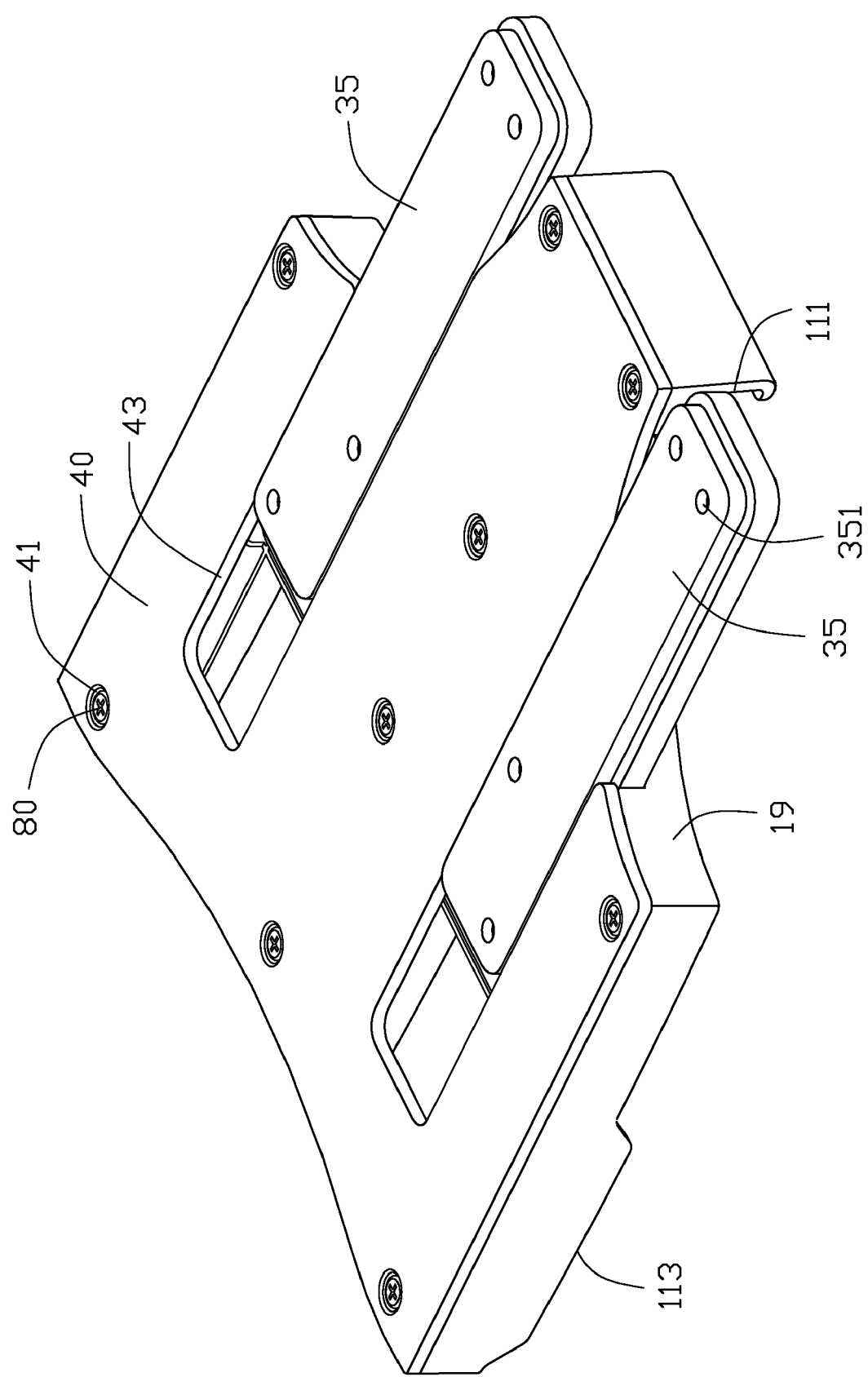
FIG. 4 shows the sliding member in a second position of the embodiment shown in FIG. 3.

Referring also to FIGS. 2-4, the extending portions 23, 25 of the spring member 20 are extended through the through holes 3331 of the retaining portion 333 of the sliding member 30. The sliding member 30 together with the spring member 20 is placed in the support member 10. The positioning posts 171 are slidably received in the sliding slot 32 of the sliding member 30. The arc-shaped base portion 21 of the spring member 20 is positioned in the third cutout 151, and the extending portions 23, 25 are positioned in the first cutouts 131 and the second cutouts 141 of the support member 10. The cover 40 is placed on the support member 10, and the sliding portions 35 of the sliding member 30 are located in the sliding opening 43 of the cover 40. The cover holes 41 are aligned with the first mounting post 16, the second mounting posts 18 and the positioning posts 17. A plurality of fasteners 80 is fixed in the cover holes 41, the first mounting hole of the first mounting post 16, the second mounting holes of the second mounting posts 18, and the positioning holes of the positioning posts 17, thereby fixing the cover 40 on the support member 10. The sliding portions 35 extend out of the support member 10. Thus, the sliding member 30 is slidable between the support member 10 and the cover 40, and the retaining portions 333 can be slid relative to the spring member 20.

When the sliding member 30 is in a first position (as shown in FIG. 3), the retaining portions 333 are closest to the arc-shaped base portion 21 of the spring member 20. When the sliding member 30 is in a second position (as shown in FIG. 4), the retaining portions 333 are furthest away from the arc-shaped base portion 21. When the sliding member 30 is slid between the first position and the second position to urge the retaining portion 333 to press the extending portions 23, 25, enough friction exists between the extending portions 23, 25 and the retaining portions 333 to retain the sliding member 30 in any position between the first position and the second position.

The extending portions 23, 25 can be adjusted to position the two different second cutouts 141 of the support member 10, so as to increase or decrease the friction between the retaining portions 333 and the extending portions 23, 25.

Figure 5:
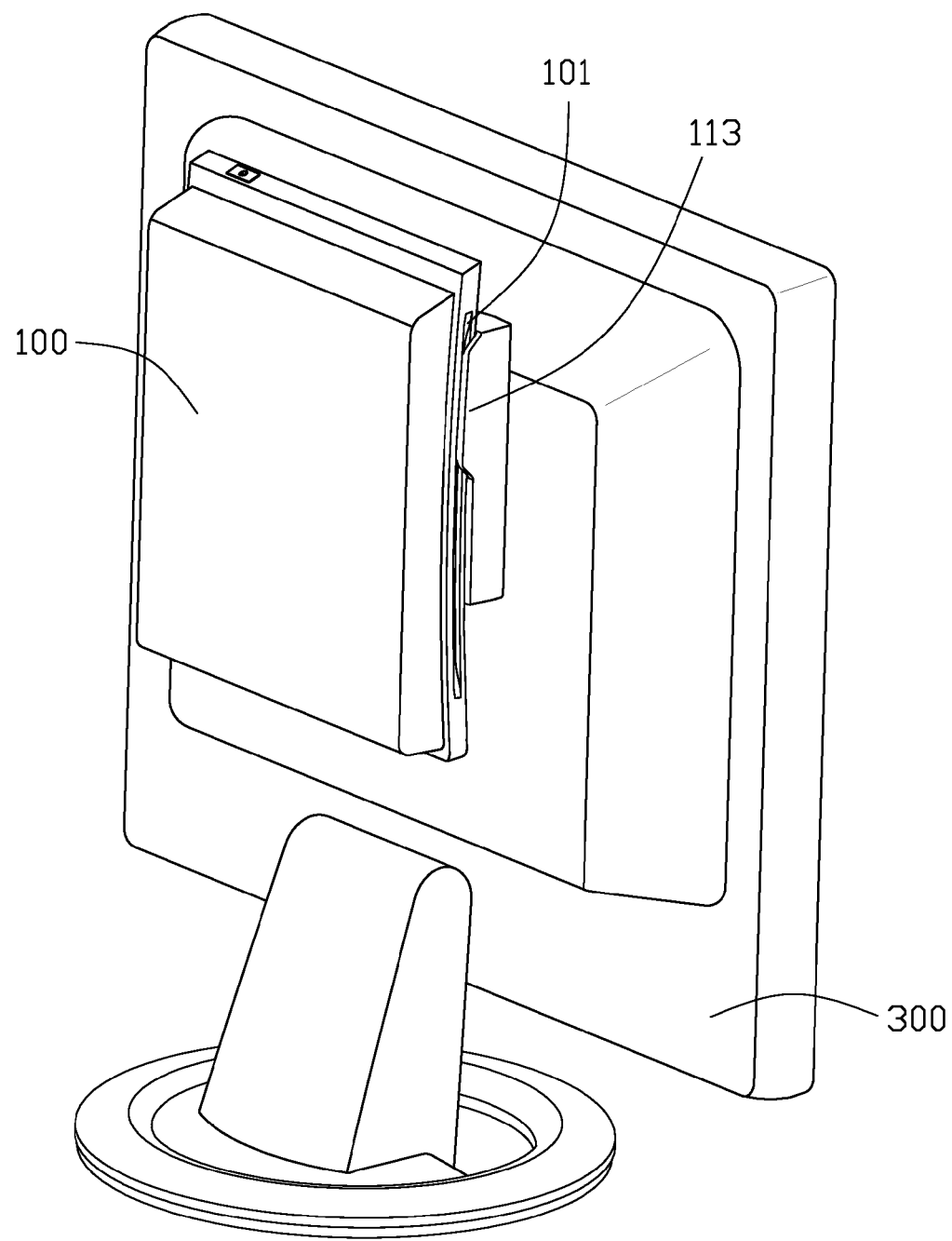
FIG. 5 is an assembled view of the embodiment shown in FIG. 1, a display, and an electronic device.
Figure 6:
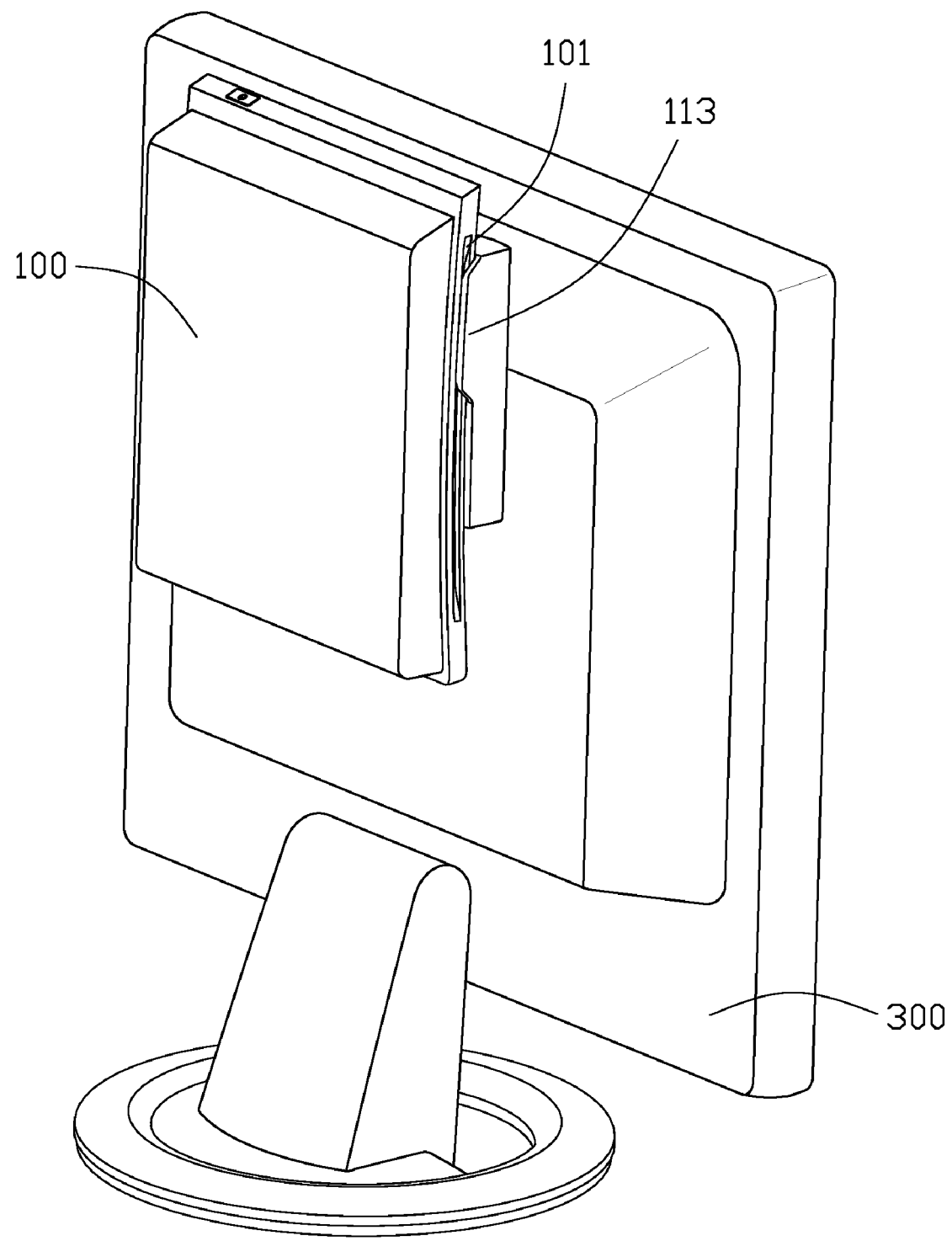
FIG. 6 is similar to FIG. 5, but showing the electronic device in another position.

Referring also to FIGS. 5-6, the sliding member 30 is fixed on the display 300 with fasteners such as screws or adhesive. The electronic device 100 with securing slots 101 is located on the support member 10 among the support flange 111 and the positioning flanges 113, and the securing slots 101 receive parts of the positioning flanges 113. To adjust the position of the electronic device 100, the electronic device 100 together with the support member 100 is slid relative to the sliding member 30. The retaining portions 333 of sliding member 30 are therefore slid relative to the spring member 20 between the first position and the second position. The interaction between the retaining portions 333 and the extending portions 23, 25 can maintain the sliding member in any position between the first position and the second position.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
   a support member configured for supporting an electronic device thereon;
   a sliding member configured for being secured to a display, a retaining portion located on the sliding member and defining a through hole;
   a spring member secured on the support member, and engaging in the through hole of the sliding member; and
   a cover secured on the support member to position the sliding member between the support member and the cover;
   wherein the sliding member is slidable relative to the support member and the spring member, the retaining portion resiliently deforms the spring member, and the retaining portion is capable of sliding relative to the spring member.

2. The mounting apparatus of claim 1, wherein the sliding member defines a sliding slot; a positioning post is located on the support member and slidable in the sliding slot.

3. The mounting apparatus of claim 1, wherein the cover defines a sliding opening; a protrusion protrudes from the sliding member and is slidable the sliding opening.

4. The mounting apparatus of claim 1, wherein a first flange and a second flange parallel to the first flange are perpendicular located on a bottom wall of the support member; the first flange defines a first cutout; the second flange defines a second cutout; the spring member is secured in the first cutout and the second cutout by the sliding member.

5. The mounting apparatus of claim 1, wherein the support member defines an access for the sliding member extending out of the support member.

6. The mounting apparatus of claim 1, wherein a support flange and two positioning flanges are located on the support member and configured to secure the electronic device.

7. A mounting apparatus comprising:
   a support member configured for maintaining an electronic device thereon;
   a sliding member configured for being secured on a display, two retaining portions located on the sliding member;
   a spring member secured on the support member, the spring member comprising a base portion and two extending portions extending from the base portion, the extending portions engaging with the retaining portion of the sliding member; and
   a cover secured on the support member to position the sliding member between the support member and the cover;
   wherein the sliding member is slidable relative to the support member and the spring member; the retaining portions resiliently deforms the spring member by urging the extending portions.

8. The mounting apparatus of claim 7, wherein the sliding member defines a sliding slot; and a positioning post is located on the support member and slidable in the sliding slot.

9. The mounting apparatus of claim 8, wherein the positioning post and the sliding slot are positioned between the extending portions of the spring member.

10. The mounting apparatus of claim 7, wherein the cover defines a sliding opening; and a protrusion protrudes from the sliding member and is slidable the sliding opening.

11. The mounting apparatus of claim 7, wherein a first flange and a second flange parallel to the first flange are perpendicular to and located on a bottom wall of the support member; the first flange defines a first cutout; the second flange defines a second cutout; and the extending portions of the spring member are secured in the first cutout and the second cutout by the sliding member.

12. The mounting apparatus of claim 11, wherein a third flange is located on the support member and perpendicular to the first and second flanges; the third flange defines a third cutout; and the base portion of the spring member is secured in the third cutout of the by the sliding member.

13. The mounting apparatus of claim 7, wherein the support member defines an access for the sliding member extending out of the support member.

14. The mounting apparatus of claim 7, wherein a support flange and two positioning flanges are located on the support member, and configured to secure the electronic device.

15. The mounting apparatus of claim 7, wherein the base portion of the spring member is arc-shaped.

* * * * *